United States Patent
Posamentier

(10) Patent No.: US 8,468,363 B2
(45) Date of Patent: Jun. 18, 2013

(54) TIME-DOMAIN REFLECTOMETRY USED TO PROVIDE BIOMETRIC AUTHENTICATION

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/347,870

(22) Filed: Jan. 11, 2012

(65) Prior Publication Data

US 2012/0110660 A1 May 3, 2012

Related U.S. Application Data

(63) Continuation of application No. 11/675,010, filed on Feb. 14, 2007, now Pat. No. 8,117,460.

(51) Int. Cl.
*G06F 21/00* (2006.01)
(52) U.S. Cl.
USPC .............................. 713/186; 726/28
(58) Field of Classification Search
None
See application file for complete search history.

(56) References Cited

U.S. PATENT DOCUMENTS

| | | | |
|---|---|---|---|
| 4,197,529 A | 4/1980 | Ramstedt et al. | |
| 4,500,784 A | 2/1985 | Hacskaylo | |
| 4,766,386 A | 8/1988 | Oliver et al. | |
| 5,521,512 A * | 5/1996 | Hulina | 324/533 |
| 5,719,950 A | 2/1998 | Osten et al. | |
| 6,509,740 B1 | 1/2003 | Needle et al. | |
| 6,512,377 B1 * | 1/2003 | Deng et al. | 324/533 |
| 7,988,038 B2 * | 8/2011 | Beenau et al. | 235/379 |
| 2003/0098774 A1 | 5/2003 | Chornenky | |
| 2005/0057869 A1 * | 3/2005 | Hale et al. | 361/64 |
| 2005/0267712 A1 | 12/2005 | Julicher et al. | |
| 2006/0123305 A1 | 6/2006 | Linam et al. | |
| 2007/0211922 A1 | 9/2007 | Crowley et al. | |
| 2008/0000988 A1 | 1/2008 | Farooq et al. | |
| 2008/0159368 A1 * | 7/2008 | Mende et al. | 375/226 |
| 2009/0145973 A1 | 6/2009 | Farooq et al. | |
| 2010/0034433 A1 | 2/2010 | Thiebot et al. | |
| 2011/0093217 A1 * | 4/2011 | Kates | 702/24 |

* cited by examiner

*Primary Examiner* — Nathan Flynn
*Assistant Examiner* — Michael R Vaughan
(74) *Attorney, Agent, or Firm* — Kacvinsky Daisak PLLC

(57) ABSTRACT

An electronic device includes one or more of a time-domain reflectometry and security block within a processor. The time-domain reflectometry and security block may determine a digitized reflected waveform biometrics characterization of a biometric target. Other embodiments are described and claimed.

17 Claims, 3 Drawing Sheets

TIME-DOMAIN REFLECTOMETRY USED TO PROVIDE BIOMETRIC AUTHENTICATION

Most multi-user operating systems include an authorization or access security process to protect computer resources by only allowing those resources to be used by consumers that have been granted authority to use them. When a consumer tries to use a resource, the authorization process checks that the consumer has been granted permission to use that resource. Resources may include individual files, data, computer programs, computer devices and functionality provided by computer applications. Permissions have generally been defined in some type of security policy application.

As technological developments permit compression of voice, video, imaging, and data information, the transfer of larger amounts of data have greatly increased the need to protect the integrity of the data and the data transfers by improving security measures in evolving applications. Therefore, improved circuits and methods for granting authorization and protecting data are needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
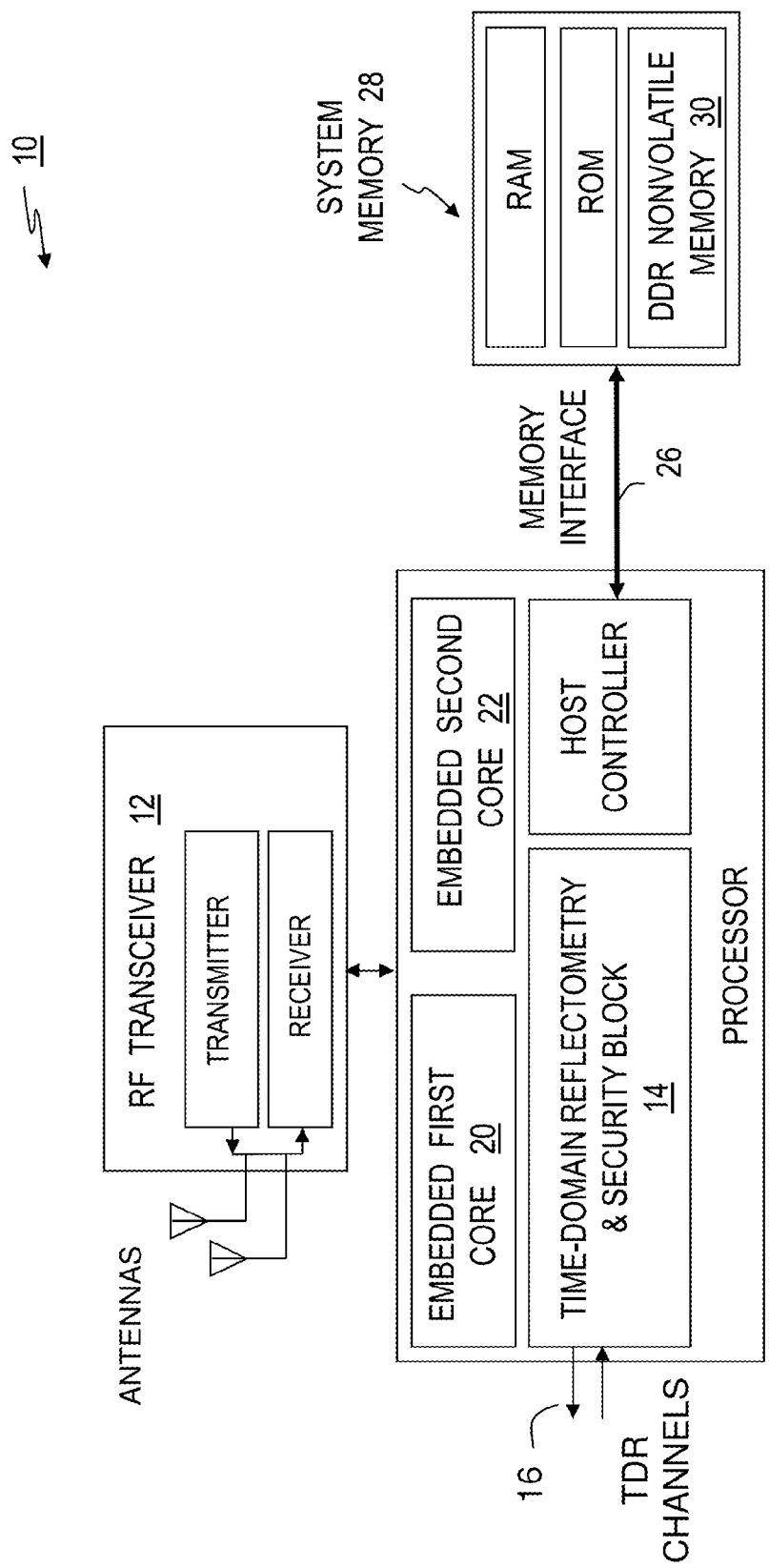
FIG. 1 is a diagram that illustrates a portable device that is capable of executing an algorithm using time-domain reflectometry to provide biometric identification and authentication in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The embodiment illustrated in FIG. 1 shows a wireless communications device 10 that includes one or more radios to allow communication with other over-the-air communication devices. Communications device 10 may operate as a cellular device or a device that operates in wireless networks such as, for example, Wireless Fidelity (Wi-Fi) that provides the underlying technology of Wireless Local Area Network (WLAN) based on the IEEE 802.11 specifications, WiMax and Mobile WiMax based on IEEE 802.16-2005, Wideband Code Division Multiple Access (WCDMA), and Global System for Mobile Communications (GSM) networks, although the present invention is not limited to operate in only these networks. The radio subsystems collocated in the same platform of communications device 10 provide the capability of communicating in an RF/location space with other devices in a network.

It should be noted that the present invention is not limited to wireless applications and may be used in a variety of products. For instance, the claimed subject matter may be incorporated into desktop computers, laptops, MP3 players, cameras, communicators and Personal Digital Assistants (PDAs), medical or biotech equipment, automotive safety and protective equipment, automotive infotainment products, etc. However, it should be understood that the scope of the present invention is not limited to these examples.

The simplistic embodiment illustrates the coupling of antenna(s) to the transceiver 12 to accommodate modulation/demodulation. In general, analog front end transceiver 12 may be a stand-alone Radio Frequency (RF) discrete or integrated analog circuit, or transceiver 12 may be embedded with a processor as a mixed-mode integrated circuit where the processor processes functions that fetch instructions, generate decodes, find operands, and perform appropriate actions, then stores results. The processor may include baseband and applications processing functions and utilize one or more processor cores 20 and 22 to handle application functions and allow processing workloads to be shared across the cores. The processor may transfer data through an interface 26 to memory storage in a system memory 28.

Traditionally Time-Domain Reflectometry (TDR) techniques have been employed in a variety of applications that include determining the characteristics of electrical lines; measuring the moisture of unsaturated soils; detecting fluids for leak and pollution discovery; measuring water pressures and water levels for hydrological purposes; monitoring deformation and stability of mine slopes and structures, among other applications. However, in accordance with the present invention TDR techniques have been employed and shown in the embodiment for communications device 10 to facilitate biometric measurements that are pertinent to applications having identity authentication systems. Specifically, time-domain reflectometry & security block 14 enables measurements to generate an impedance profile of selected objects.

Time-domain reflectometry consists of feeding an impulse of current or voltage into TDR channels 16 and then observing that reflected energy by reflectometry & security block 14. This may be done in parallel for the individual channels or it may be done synchronously. TDR channels 16 include multiple conductors to supply a fast-rise pulse and receive the resultant reflections from selected target locations. By analyzing the magnitude, deviation, and shape of the reflected waveform the electrical differences, the discontinuities and the waveform variations provide a pattern to uniquely identify the target object. Specifically, TDR & security block 14 enables a short pulse of energy and analyzes the echo return to reveal details of the reflecting object which are captured to generate impedance mismatches and an impedance profile.

Figure 2:
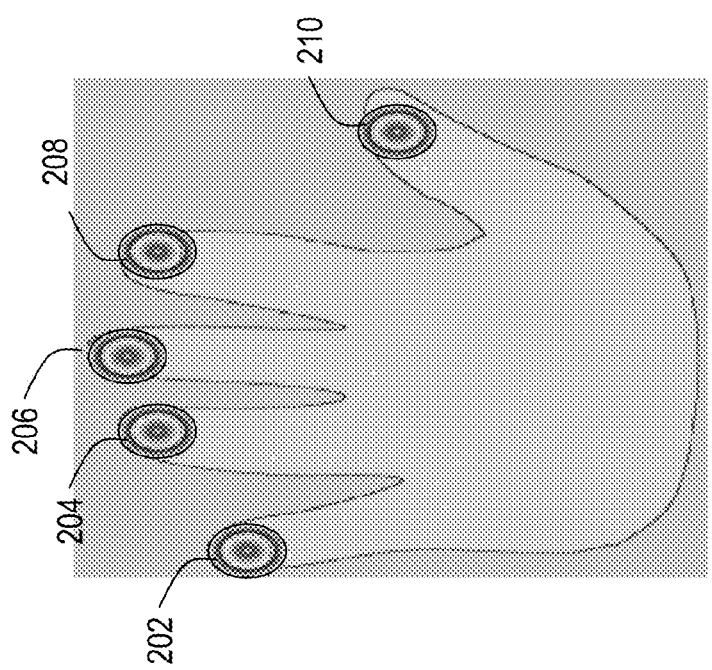
FIG. 2 illustrates the use of time-domain reflectometry to provide characteristics for biometric identification.

FIG. 2 illustrates that in this example embodiment time-domain reflectometry provides a direct look at hand characteristics. TDR & security block 14 enables the pulse and characterizes the reflected voltage waves to reveal the characteristic impedance of desired locations on the hand as indicated by TDR contact 202, TDR contact 204, TDR contact 206, TDR contact 208 and TDR contact 210. Although FIG. 2 shows a hand to illustrate the use of finger print scanners, other types of example applications may include thermal hand imagers, retinal scanners and facial recognition systems. The processor may execute the proper software to perform, for example, an Inverse Fast Fourier Transform (IFFT) in generating a digital representation of the reflected pulse from the incident pulse. The processor compares the digitized reflected waveform to a database that may be stored in system memory 28, or alternatively, a database accessible to communications device 10 through external communications. Various waveform correlation algorithms may be employed to determine whether or not a given measurement matches a waveform in the authentication database, and if so, to what degree of confidence. This allows for varying degrees of authentication quality and may also prompt the system user for additional modes of authentication.

Note that in some embodiments the comparison of the digitized reflected waveform to the stored database may be performed by the processor, or alternatively, by an external server with access to the stored database. Once the processor of communications device 10 or the external server determines a match, authentication is indicated and the user may be granted additional permission rights. Thus, the TDR techniques provide a digitized reflected waveform biometrics characterization that may be compared with records in a stored database and the comparison results may be applied to personal security and authentication.

In an alternate embodiment, Optical Time Domain Reflectometer techniques may be used to provide a short intense laser pulse and the reflected light analyzed for light loss, degree of backscatter and reflection of light. The TDR analysis begins with the propagation of a step or impulse of energy and the subsequent observation of the energy reflected by the system to determine the reflected light characteristics analyzed to establish the hand characteristics. By analyzing characteristics such as, for example, magnitude, duration and shape of the reflected waveform, the nature of the impedance variation in the reflected light may be determined. This technique may be applied to one of the hands, eyes, to a portion of skin or other biometric target. The illuminating laser would be relatively low amplitude for safety but still provide an amplitude sufficient for modern optical and OTDR receivers to discern.

Figure 3:
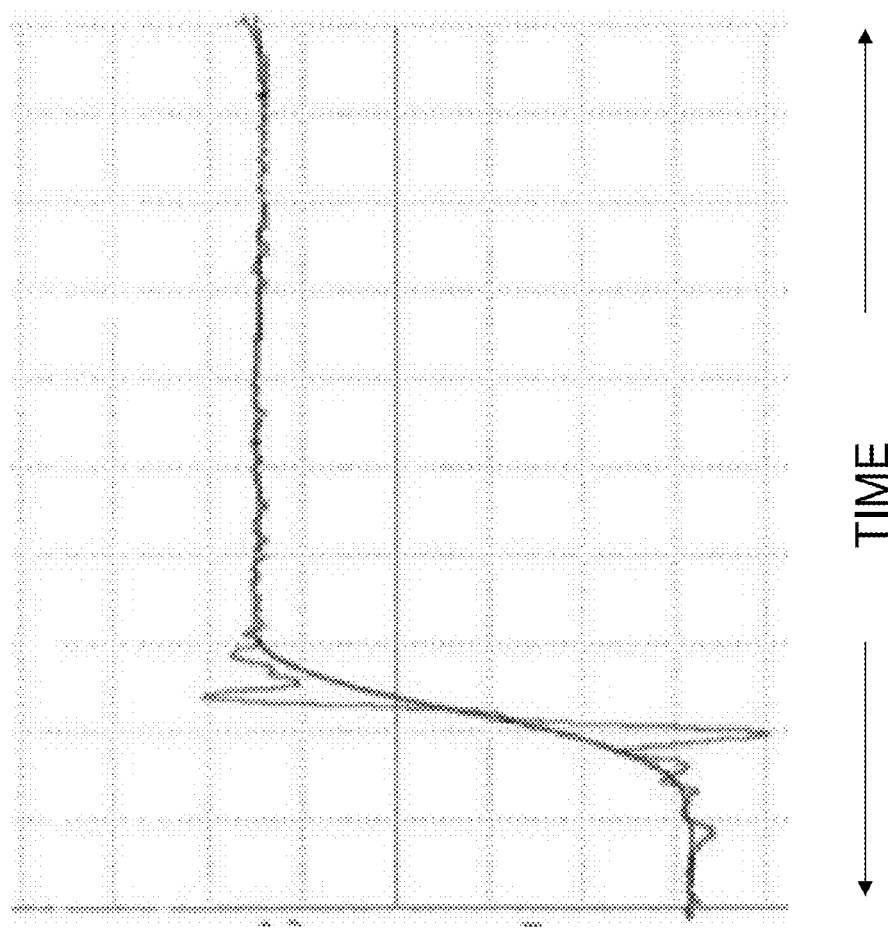
FIG. 3 illustrates the outgoing step pulse and the returning echoes in the time-domain reflectometry used to provide biometric authentication.

FIG. 3 illustrates the waveform of the outgoing step pulse and the returning echoes for a TDR system. An examination of the time delay and wave shape of the echoes present allows a record of discontinuities and characteristics of the hand. In this embodiment five TDR channels are illustrated by the five TDR contacts used to uniquely characterize individual patterns for the hand of a person. The characteristics of the electrical path are very different from finger to finger and from person to person. The characteristic waveforms from different TDR channels may be compared with a database of stored waveforms in a database to determine authentication.

Figure 4:
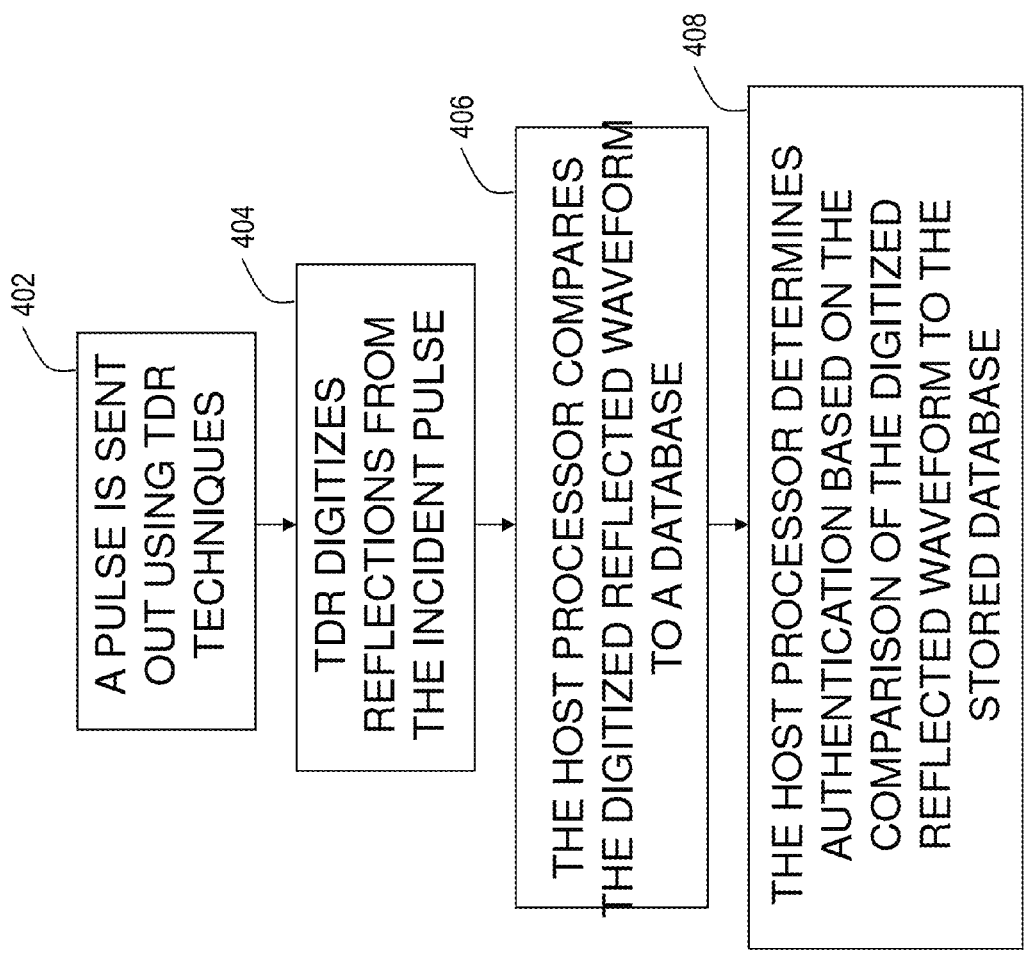
FIG. 4 illustrates a flow diagram that may be used to implement the algorithm using the time-domain reflectometry for biometric authentication.

FIG. 4 is a flowchart that in accordance with various embodiments of the present invention illustrates an algorithm that uses a TDR method of identifying characteristic waveforms to provide security in various operations. Thus, method 400 may be used in a computer system that supports a single processing engine, or a system having multiple processing cores or multiple security domains to protect secrets that applications are allowed to use. Method 400 determines an authorization to permit an association between the processing cores or security domains and a designated set of secrets for all commands sent to the processing device.

In some embodiments, method 400, or portions thereof, is performed by a controller, a processor, or an electronic system, embodiments of which are shown in the various figures. Method 400 is not limited by the particular type of apparatus, software element, or system performing the method. The various actions in method 400 may be performed in the order presented, or may be performed in a different order. Further, in some embodiments, some actions listed may be omitted from method 400.

Method 400 is shown beginning at block 402 in which a pulse is sent out using TDR techniques by communication device 10. Block 404 shows that the TDR digitizes reflections from the incident pulse. Block 406 shows that the host processor compares the digitized reflected waveform to a database. Block 408 shows that the host processor determines authentication based on the comparison of the digitized reflected waveform to the stored database.

By now it should be apparent that embodiments of the present invention allow high-performance biometric authentication that may be used in applications such as, for example, finger print scanners, thermal hand imagers, retinal scanners and facial recognition, among others. By using a TDR & security block embedded at a silicon level, TDR techniques may be integrated into a trusted platform module that may be used in a variety of platforms in mobile devices to provide scanner or imaging methods for biometric authentication. Without requiring an imager, a clean sensor, or any other proprietary hardware, the TDR & security block may be instantiated in a variety of form factors including mobile phones, handheld PDA's, laptops, keyboards, mice, etc. Thus, in accordance with the present invention TDR data may be taken to measure human impedance and characteristics for biometric identification.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A device comprising:
a time-domain reflectometry and security block within a processor, the time-domain reflectometry and security block to determine a digitized reflected waveform biometrics characterization of a biometric target, the processor to determine a degree of confidence in a match between the digitized reflected waveform biometrics characterization and a recorded waveform in an authentication database corresponding to a biometric target to authenticate a person associated with the biometric target.

2. The device of claim 1, comprising:
the processor to compare the digitized reflected waveform biometrics characterization with the recorded waveform.

3. The device of claim 1, comprising:
the time-domain reflectometry and security block to determine a pattern to uniquely characterize the biometric target.

4. The device of claim 1, comprising:
the time-domain reflectometry and security block to generate an impedance profile of the biometric target.

5. The device of claim 1, the biometric target comprising at least a portion of human skin, a human face, a human eye, or a human hand.

6. The device of claim 1, the processor comprising an inverse fast Fourier transform.

7. At least one non-transitory machine readable medium comprising a plurality of instructions that in response to being executed on a computing device cause the computing device to:

cause a pulse of energy to be sent to a biometric target via a time-domain reflectometry and security block within a processor;

provide a digitized reflected waveform biometrics characterization of the biometric target via the time-domain reflectometry and security block;

determine a degree of confidence in a match between the digitized reflected waveform biometrics characterization and a recorded waveform in an authentication database and provide authentication to a person associated with the biometric target based on the degree of confidence.

8. The least one non-transitory machine readable medium of claim 7, comprising a plurality of instructions that in response to being executed on a computing device cause the computing device to receive an echo from the pulse to generate an impedance profile.

9. The least one non-transitory machine readable medium of claim 7, comprising a plurality of instructions that in response to being executed on a computing device cause the computing device to analyze one or more of a magnitude, a deviation, a duration and a shape of the digitized reflected waveform biometrics characterization.

10. The least one non-transitory machine readable medium of claim 7, comprising a plurality of instructions that in response to being executed on a computing device cause the computing device to cause multiple time-domain reflectometry channels to be provided.

11. The least one non-transitory machine readable medium of claim 7, comprising a plurality of instructions that in response to being executed on a computing device cause the computing device to compare the digitized reflected waveform biometrics characterization with the recorded waveform.

12. An apparatus, comprising:

a memory storage;

a time-domain reflectometry and security block within a processor, the time-domain reflectometry and security block to determine a digitized reflected waveform biometrics characterization of a biometric target, and the processor to determine a degree of confidence in a match between the digitized reflected waveform biometrics characterization and a recorded waveform in an authentication database corresponding to the biometric target;

the processor to provide authentication to a person associated with the biometric target based on the degree of confidence.

13. The apparatus of claim 12, comprising:

the processor to compare the digitized reflected waveform biometrics characterization with the recorded waveform.

14. The apparatus of claim 12, comprising:

the time-domain reflectometry and security block to cause a pulse of energy to be sent to the biometric target.

15. The apparatus of claim 12, comprising:

the time-domain reflectometry and security block to determine a pattern to uniquely characterize the biometric target.

16. The apparatus of claim 12, the time-domain reflectometry and security block to generate an impedance profile of the biometric target.

17. The apparatus of claim 12, the biometric target comprising at least a portion of human skin, a human face, a human eye, or a human hand.

* * * * *

UNITED STATES PATENT AND TRADEMARK OFFICE
CERTIFICATE OF CORRECTION

PATENT NO. : 8,468,363 B2
APPLICATION NO. : 13/347870
DATED : June 18, 2013
INVENTOR(S) : Joshua Posamentier It is certified that error appears in the above-identified patent and that said Letters Patent is hereby corrected as shown below:

In the Claims:

In column 5, line 14, In Claim 7, delete "base and" and insert -- base; and --, therefor.

In column 5, line 17, In Claim 8, delete "least" and insert -- at least --, therefor.

In column 5, line 22, In Claim 9, delete "least" and insert -- at least --, therefor.

In column 5, line 28, In Claim 10, delete "least" and insert -- at least --, therefor.

In column 5, line 33, In Claim 11, delete "least" and insert -- at least --, therefor.

Signed and Sealed this
Thirteenth Day of August, 2013

Teresa Stanek Rea
*Acting Director of the United States Patent and Trademark Office*